(12) United States Patent
Mizoguchi

(10) Patent No.: US 9,030,993 B2
(45) Date of Patent: May 12, 2015

(54) COMMUNICATION DEVICE, CONNECTION METHOD AND STORAGE MEDIUM

(75) Inventor: Naoki Mizoguchi, Tokyo (JP)

(73) Assignee: Lenovo Innovations Limited (Hong Kong), Quarry Bay (HK)

(*) Notice: Subject to any disclaimer, the term of this patent is extended or adjusted under 35 U.S.C. 154(b) by 767 days.

(21) Appl. No.: 13/263,753

(22) PCT Filed: Apr. 21, 2010

(86) PCT No.: PCT/JP2010/057515
§ 371 (c)(1),
(2), (4) Date: Oct. 10, 2011

(87) PCT Pub. No.: WO2010/126069
PCT Pub. Date: Nov. 4, 2010

(65) Prior Publication Data
US 2012/0033660 A1    Feb. 9, 2012

(30) Foreign Application Priority Data

Apr. 30, 2009    (JP) .................................. 2009-111424

(51) Int. Cl.
*H04W 4/00* (2009.01)
*H04W 12/08* (2009.01)
*H04W 8/26* (2009.01)
(Continued)

(52) U.S. Cl.
CPC ................ *H04W 12/08* (2013.01); *H04W 8/26* (2013.01); *H04W 48/02* (2013.01); *H04W 60/00* (2013.01); *H04W 84/12* (2013.01); *H04W 88/08* (2013.01)

(58) Field of Classification Search
CPC ....... H04L 1/2834; H04L 1/2836; H04L 1/66; H04L 1/06272; H04W 88/04; H04W 88/06; H04B 7/15507
See application file for complete search history.

(56) References Cited

U.S. PATENT DOCUMENTS

| 6,726,297 | B1 | 4/2004 | Uesugi |
| 8,316,438 | B1 * | 11/2012 | Bush et al. ....................... 726/22 |
| 2012/0317224 | A1 * | 12/2012 | Caldwell et al. .............. 709/217 |

FOREIGN PATENT DOCUMENTS

| JP | 3-210838 A | 9/1991 |
| JP | 10-271154 A | 10/1998 |

(Continued)

OTHER PUBLICATIONS

Korean Office Action for KR10-2011-7025445 mailed on May 28, 2013 with Partial English Translation.

(Continued)

*Primary Examiner* — Alvin Zhu

(57) ABSTRACT

In order that even a wireless terminal whose an unique ID is not registered in the filter list can use simply the access point without a prior setting task by user, a communication device includes access point means, filtering disabling means, unique ID registration means and filtering enabling means. The access point means connects a wireless terminal with at least one of a lower network and an upper network. The filtering disabling means disables a filtering which prevents connecting with an unregistered wireless terminal whose an unique ID is not registered in a filter list. The unique ID registration means acquires the unique ID of the wireless terminal and registers the acquired unique ID in the filter list, upon a state where the filtering is disabling, if a connection request is received from the wireless terminal. The filtering enabling means enables the filtering after the unique ID of the wireless terminal is registered in the filter list.

8 Claims, 8 Drawing Sheets

(51) Int. Cl.
*H04W 48/02* (2009.01)
*H04W 60/00* (2009.01)
*H04W 84/12* (2009.01)
*H04W 88/08* (2009.01)

(56) References Cited

FOREIGN PATENT DOCUMENTS

| | | |
|---|---|---|
| JP | 2000134663 A | 5/2000 |
| JP | 3082686 B | 8/2000 |
| JP | 2002159053 A | 5/2002 |
| JP | 2003-51828 A | 2/2003 |
| JP | 2003249937 A | 9/2003 |
| JP | 2004215232 A | 7/2004 |
| JP | 2005303459 A | 10/2005 |
| JP | 2005150372 A | 2/2006 |
| JP | 2006135874 A | 5/2006 |
| JP | 2007-282255 A | 10/2007 |
| JP | 2008078790 A | 4/2008 |
| JP | 2008172341 A | 7/2008 |
| KR | 10-2005-0043709 A | 5/2005 |

OTHER PUBLICATIONS

Japanese Office Action for JP Application No. 2011-511425 mailed on Jan. 28, 2014 with English Translation.
International Search Report for PCT/JP2010/057515 mailed Jun. 22, 2010.
State Intellectual Property Office of People's Republic of China, Application No. 201180018215.0, issuing date: Oct. 8, 2014, all pages.

* cited by examiner

COMMUNICATION DEVICE, CONNECTION METHOD AND STORAGE MEDIUM

TECHNICAL FIELD

The present invention relates to a communication device (for example, a mobile phone) which operates as an access point in wireless LAN (Local Area Network), a connection method of connecting a wireless LAN terminal with the communication device, and a storage medium.

BACKGROUND ART

A wireless LAN terminal tends to use widely. The wireless LAN terminal is a wireless terminal equipped with a wireless LAN interface. For example, a game machine is a kind of the wireless LAN terminal. The game machine can realize a competitive game via a communication network (for example, the Internet). Further, the game machine can download game software by using the communication network.

When the wireless LAN terminal is connected with the network, an access point or a router provided with an access point function is usually used. The access point has a function to connect the wireless LAN terminal with a lower network (for example, a wired LAN). The router provided with the access point function has a function to connect the wireless LAN terminal with a upper network (for example, the Internet).

The access point is connected with a wireless LAN terminal by wireless. This causes a problem, for example, a problem of unauthorized use of the access point. For the purpose of preventing the problem, the access point is usually provided with a security function (filtering, encryption and the like).

For example, using a filter list, a filtering function can restrict the wireless LAN terminal which is allowed to be connected to the access point. The filter list is a list in which a unique ID (Identification) (for example, MAC (Media Access Control) address) of the wireless LAN terminal whose connection is allowed is registered. The filtering function does not permit connection between the access point and a wireless LAN terminal whose the unique ID is not registered in the filter list. For example, Japanese Patent Application Laid-Open No. H10 (1998)-271154 and Japanese Patent Publication No. 3082686 disclose such technologies.

By the way, in recent years, a portable communication device (for example, mobile phone) provided with the wireless LAN access point function has been proposed.

Such the portable communication device can connect the wireless LAN terminal with the network such as the Internet in a desired place. Therefore, it is assumed that such the communication device is used in various opportunities.

For example, it is assumed that a portable wireless LAN terminal (a mobile PC equipped with the wireless LAN interface, a portable game machine equipped with the wireless LAN interface and the like) is connected with the Internet at an outside location by means of its own access point function. It is also assumed that, when the access point installed in an office is out of order, the access point function of the mobile phone is temporarily used as a substitute for the access point of the office.

The access point function of the portable communication, device has the security function including filtering and encryption similarly to the usual access point function. Accordingly, when connecting the wireless LAN terminal, which is not registered in advance, with the portable communication device, a task (setting task) that a user changes a setting of the security function on the portable communication device is necessary.

However, the setting task includes a task of looking up a MAC address of the wireless LAN terminal to be connected and a task of adding the MAC address into the filter list. Those tasks require expert knowledge. Accordingly, it is difficult for a general user to use the access point function of the mobile phone easily.

In recent years, various technologies to simplify the setting task of connecting the access point with the wireless LAN terminal are proposed. For example, in a setting system disclosed in Japanese Patent Application Laid-Open No. 2006-135874, when a wireless LAN terminal is set in a cradle having charging and communication functions, various kinds of communication control information necessary for wireless LAN communication is transmitted automatically to the wireless LAN terminal.

However, in the setting system of Japanese Patent Application Laid-Open No. 2006-135874, even if the setting task is simplified, the prior setting task of setting the wireless LAN terminal into the cradle is necessary. Accordingly, the setting system of Japanese Patent Application Laid-Open No. 2006-135874 has a problem that the setting system cannot be used in unexpected or urgent cases.

SUMMARY OF INVENTION

Technical Problem

The present invention has been achieved considering the above-mentioned circumstances. The objective of the present invention is mainly to provide a communication device, a connection method and a storage medium, which can simply use the access point without the prior setting task even by the wireless terminal whose an unique ID is not registered in the filter list.

Solution to Problem

A communication device of the present invention including:

access point means for connecting a wireless terminal with at least one of a lower network and an upper network;

filtering disabling means for disabling a filtering which prevents connecting with an unregistered wireless terminal whose an unique ID is not registered in a filter list;

unique ID registration means for acquiring the unique ID of the wireless terminal and registering the acquired unique ID in the filter list, upon a state where the filtering is disabling, if a connection request is received from the wireless terminal; and filtering enabling means for enabling the filtering after the unique ID of the wireless terminal is registered in the filter list.

A connection method of the present invention including:

connecting a wireless terminal with at least one of a lower network and an upper network;

disabling a filtering which prevents connecting with an unregistered wireless terminal whose an unique ID is not registered in a filter list;

acquiring the unique ID of the wireless terminal and registering the acquired unique ID in the filter list, upon a state where the filtering is disabling, if a connection request is received from the wireless terminal; and enabling the filtering after the unique ID of the wireless terminal is registered in the filter list.

A storage medium of the present invention, the storage medium stores a program, the program including:

a connection program for realizing the present invention of the connection method by a computer.

Advantageous Effects of Invention

According to the present invention, in the communication device provided with an access point function and a filtering function, it is possible to use simply the access point function of the communication device without the prior task, even by a wireless terminal whose an unique ID is not registered in the filter list.

DESCRIPTION OF EMBODIMENTS

The following describes the exemplary embodiments of a communication device, a connection method and a connection program according to the present invention with reference to the drawings.

The processing operation (connection method) performed in the communication device in respective exemplary embodiments described below is realized by the process, means and function executed in a computer based on the commands of a program (software). The command based on the program is sent to respective components of the computer, and the component executes a specific process in the following respective exemplary embodiments according to the command. For example, the specific process includes an access point process connecting a wireless terminal with at least one of a lower network and an upper network. The specific process also includes a filtering disabling process disabling a filtering (a function which prevents connecting with a unregistering wireless terminal whose an unique ID is not registered in a filter list). Further, the specific process includes a unique ID registration process acquiring the unique ID of the wireless terminal and registering the acquired unique ID in the filter list, upon a state where the filtering is disabling, if a connection request is received from the wireless terminal. Furthermore, the specific process includes a filtering enabling process enabling the filtering after the unique ID of the wireless terminal is registered in the filter list.

In this way, each of the processes and means in respective exemplary embodiments is realized by a specific configuration in which a program and a computer cooperate.

Here, whole or a part of the program is provided from a computer-readable storage medium including a magnetic disk, optical disk, semiconductor memory and the like. The program read from the storage medium is installed in a computer and executed. The program may be loaded to a computer via not the storage medium but a communication line and then executed.

(First Exemplary Embodiment)

Figure 1:
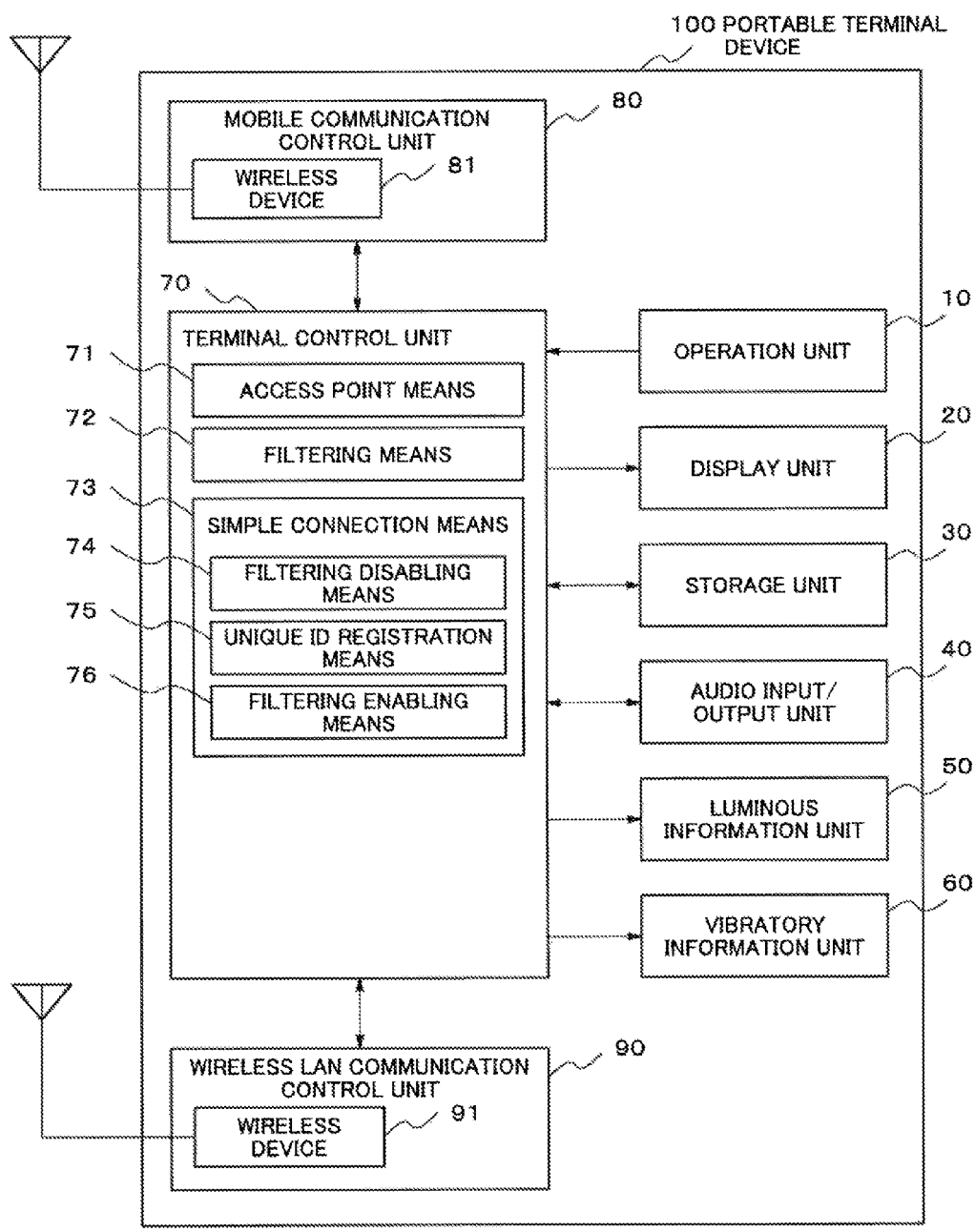
FIG. 1 is a block diagram showing a schematic configuration of a mobile terminal device in a first exemplary embodiment according to the present invention.

FIG. 1 is a block diagram showing a schematic configuration in a portable terminal device of the first exemplary embodiment according to the present invention.

As shown in FIG. 1, a portable terminal device 100 in the first exemplary embodiment is a portable-type wireless communication device represented by a mobile phone.

The portable terminal device 100 includes, as shown in FIG. 1, an operation unit 10, a display unit 20, a storage unit 30, an audio input/output unit 40, a luminous information unit 50, a vibratory information unit 60, a terminal control unit 70, a mobile communication control unit 80 and a wireless LAN communication control unit 90.

The operation unit 10 is an input device from which a user inputs a telephone number and the like. The operation unit 10 includes a plurality of push-button switches.

The display unit 20 is a display device provided with a function to inform the user of various states of the mobile phone. The display unit 20 includes a monochrome or color liquid crystal display panel.

The storage unit 30 is a storage device storing information. The information stored in the storage unit 30 includes, for example, control information on the mobile phone, information inputted by the user and information received from the outside.

The audio input/output unit 40 is an audio input/output device using for talking. The audio input/output unit 40 includes a microphone and a speaker.

The luminous information unit 50 is a device (state information device) provided with a function to inform various states of the mobile phone by light. The luminous information unit 50 includes a lamp or an LED.

The vibratory information unit 60 is a device (state information device) provided with a function to inform various states of the mobile phone by vibrating. The vibratory information unit 60 includes a vibrator.

The terminal control unit 70 is a device which controls the above units and realizes an operation as a mobile phone.

The mobile communication control unit 80 includes a wireless device (a first wireless device) 81. The wireless device 81 communicates with a base station in a mobile phone communication network (upper network). The mobile communication control unit 80 exchanges information with the terminal control unit 70. This information includes, for example, the information about the operation (control) communicating by wireless with the mobile phone communication network and the information notifying the state of the wireless communication with the mobile phone communication network.

The wireless LAN communication control unit 90 includes a wireless device (a second wireless device) 91. The wireless device 91 communicates with a wireless LAN terminal connected to a wireless LAN (lower network). The wireless LAN communication control unit 90 exchanges information with the terminal control unit 70. This information includes, for example, an information relevant to the operation (control) of communicating by wireless with the wireless LAN and an information notifying the state of the wireless communication with the wireless LAN.

In the first exemplary embodiment, the terminal control unit 70 includes an access point means 71, filtering means 72 and simple connection means 73. These means are functions realized, when the terminal control unit, 70 executes a program (access point program, filtering program, simple connection program and the like).

The access point means 71 connects a wireless LAN terminal (wireless terminal) with a wireless LAN. The access point means 71 connects a wireless LAN terminal (wireless terminal) with Internet (upper network) via a mobile phone communication network.

The filtering means 72 is a security function. The filtering means 72 does not permit connecting an unregistered wireless LAN terminal with the portable terminal device 100 itself. The unregistered wireless LAN terminal is a wireless LAN terminal whose unique ID is not registered in the filter list. For example, MAC address is used as the unique ID. The filtering using MAC address is employed in various communication apparatuses. For example, Japanese Patent Application Laid-Open No. H10 (1998)-271154 and Japanese Patent Publication No. 3082686 disclose such filtering function.

The simple connection means 73 simply connects the unregistered wireless LAN terminal with the wireless LAN and Internet. The simple connection means 73 includes filtering disabling means 74, unique ID registration means 75 and filtering enabling means 76.

The filtering disabling means 74 disables the filtering in order to enable the unregistered wireless LAN terminal to connect with the portable terminal device 100 itself.

The unique ID registration means 75 acquires the unique ID of the wireless LAN terminal and registers the acquired unique ID in the filter list, if the portable terminal device 100 receives a connection request from the unregistered wireless LAN terminal when disabling the filtering.

The filtering enabling means 76 enables the filtering after the unique ID of the wireless LAN terminal is registered in the filter list.

The simple connection means 73 enables the unregistered wireless LAN terminal to connect with the wireless LAN and Internet, without performing a setting task to register the unique ID in the filter list by user. That is, the unregistered wireless LAN terminal can use the access point simply.

Moreover, the simple connection means 73 enables the filtering promptly after registering the unique ID of the unregistered wireless LAN terminal in the filter list. By this way, the simple connection means 73 can prevent using unfairly the access point by other wireless LAN terminals.

Next, a detailed configuration of the portable terminal device in the first exemplary embodiment will be described with reference to FIGS. 2-5.

Figure 2:
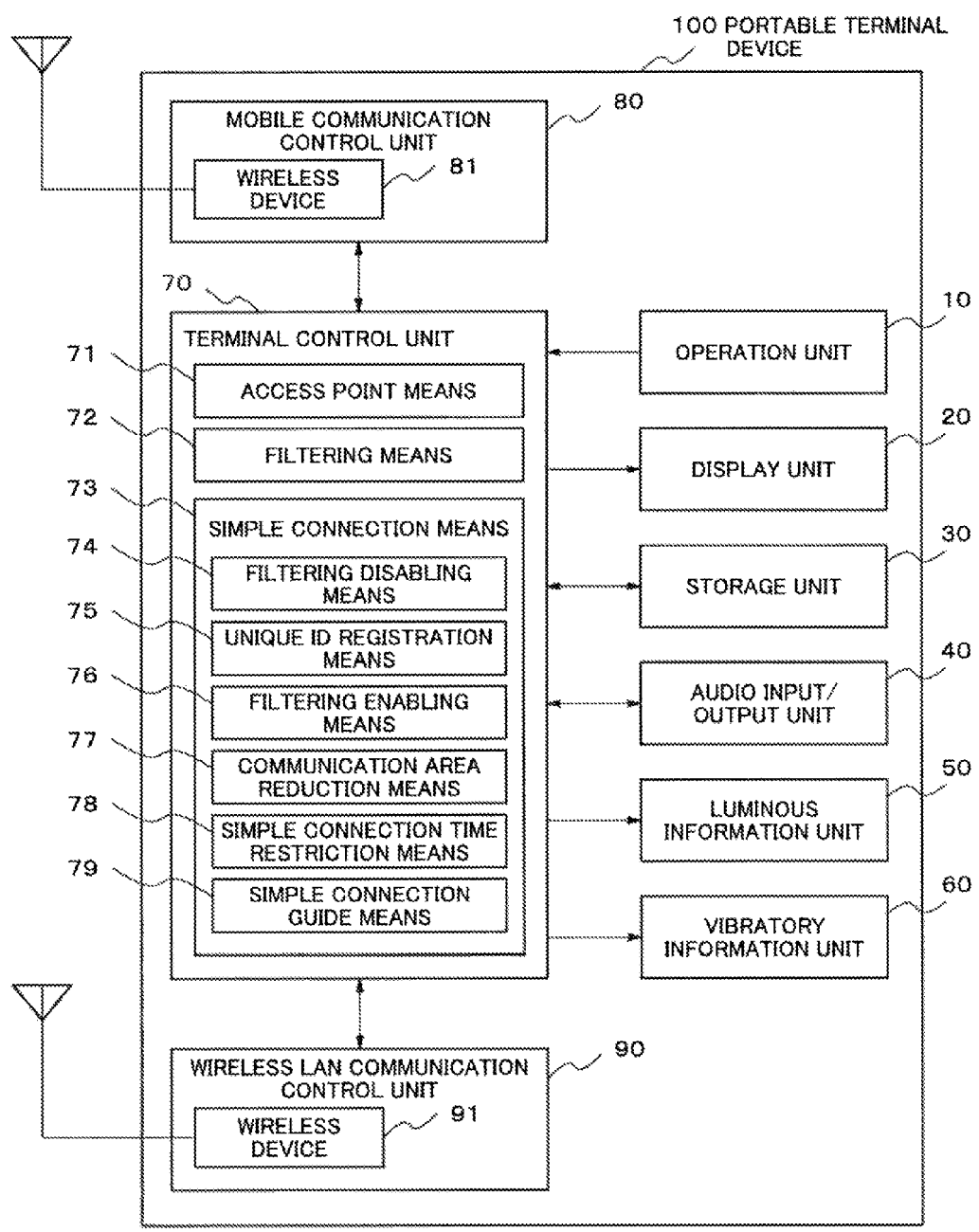
FIG. 2 is a block diagram showing a detail configuration of the mobile terminal device in the first exemplary embodiment according to the present invention.
Figure 3:
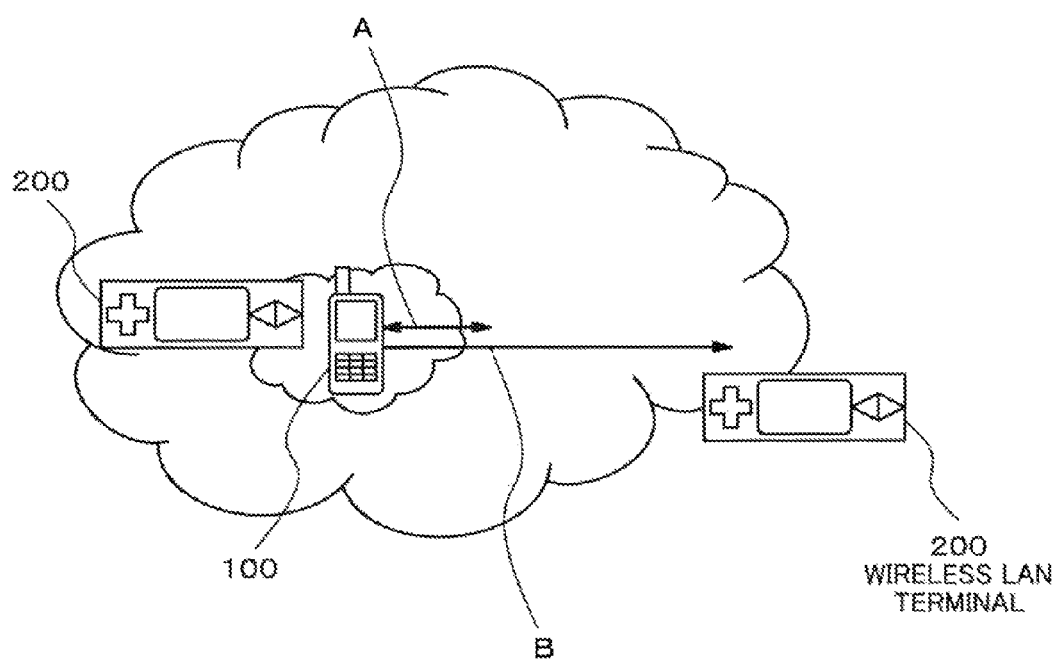
FIG. 3 is an explanatory diagram showing an area in which the mobile terminal device in the first exemplary embodiment according to the present invention can communicate.
Figure 4:
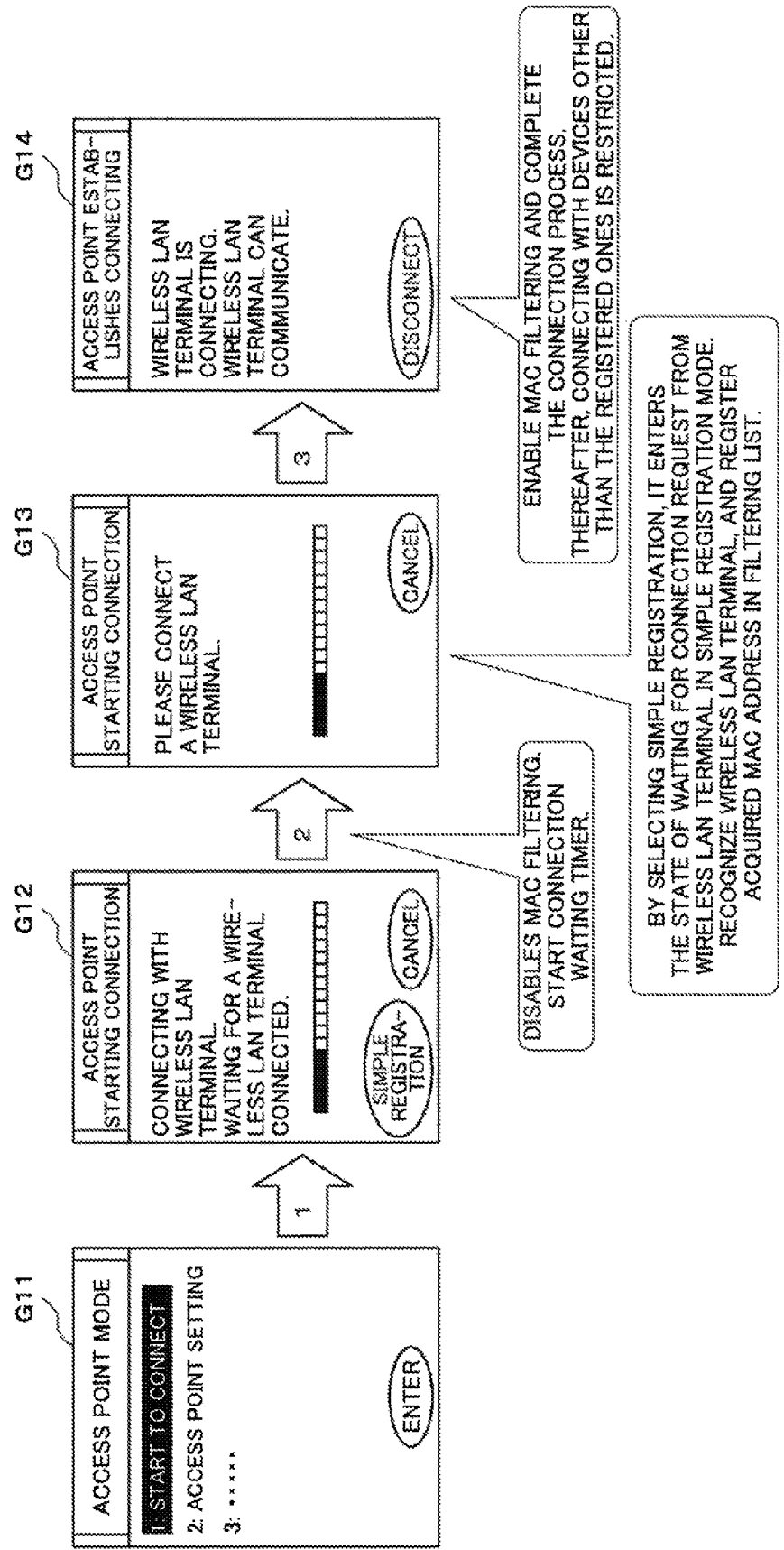
FIG. 4 is an explanatory diagram showing a screen transition while the mobile terminal device in the first exemplary embodiment according to the present invention is performing a simple connection.
Figure 5:
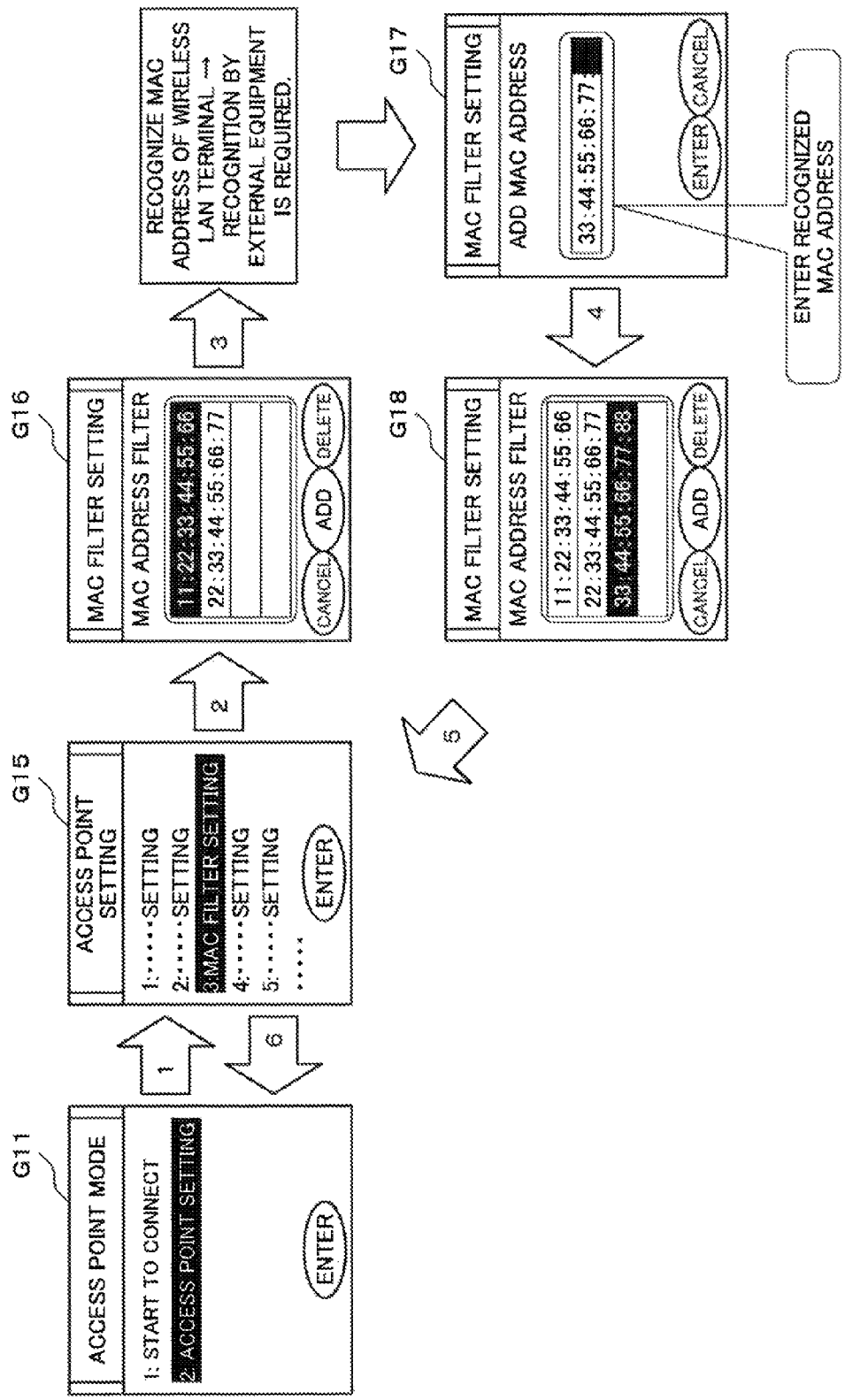
FIG. 5 is an explanatory diagram showing a screen transition while user is registering manually an unique ID on the mobile terminal device in the first exemplary embodiment according to the present invention.

FIG. 2 is a block diagram showing the detailed configuration of the portable terminal device in the first exemplary embodiment. FIG. 3 is an explanatory diagram showing an area (communication area) in which the portable terminal device in the first exemplary embodiment can communicate. FIG. 4 is an explanatory diagram showing a screen transition while the mobile terminal device in the first exemplary embodiment is performing a simple connection. FIG. 5 is an explanatory diagram showing a screen transition while user is registering manually an unique ID on the mobile terminal device in the first exemplary embodiment according to the present invention.

As shown in FIG. 2, in the first exemplary embodiment, the terminal control unit 70 of the portable terminal device 100 further includes communication area reduction means 77, simple connection time restriction means 78 and simple connection guide means 79, as the simple connection means 73.

The communication area reduction means 77 controls an area (communication area) in which the communication with a wireless LAN terminal is possible, as follows. Upon the state where the filtering is disabled, the communication area reduction means 77 reduces the communication area as compared with a state where the filtering is enabled. For example, as shown in FIG. 3, the communication area is set at communication area B (for example, 10 m) in the case where the filtering is enabled. As compared with this, the communication area is reduced so as to be set at communication area A (for example, 30 cm) by the communication area reduction means 77, in the case where the filtering is disabled.

Specifically, for example, the communication area reduction means 77 controls the output level of a radio wave, so as to reduce the output level of the radio wave in the case where the filtering is disabled, as compared with in the case where the filtering is enabled.

By this way, even when the filtering is disabled, the portable terminal device 100 can prevent a problem that the access point is used unfairly (an unauthorized use problem) and an improper connection problem.

The simple connection time restriction means 78 enables the filtering when receiving no connection request from a wireless LAN terminal 200 during a predetermined period of time (for example, 30 seconds) after disabling the filtering.

By this way, the portable terminal device 100 can avoid persisting the state where the filtering is disabled over a long time. Accordingly, the portable terminal device 100 can increase the effect of preventing the unauthorized use problem and the improper connection problem.

The simple connection guide means 79 displays a procedure of the simple connection on a display screen.

For example, on an access point mode screen (G 11) such as shown in FIG. 4, when the user selects "start to connect" and manipulates an enter button, the simple connection guide means 79 changes the access point mode screen (G11) to a access point starting connection screen (G12). This screen (G12) informs that the portable terminal device 100 tries to connect a wireless LAN terminal.

In the case of a wireless LAN terminal whose the unique ID is already registered in the filter list (registered wireless LAN terminal), the portable terminal device 100 connects the wireless LAN terminal by performing a process connecting the wireless LAN terminal. Then, the simple connection guide means 79 changes the access point starting connection screen (G12) to a screen (G14) which informs a user of the connection process having completed.

On the other hand, in the case of the unregistered wireless LAN terminal (wireless LAN terminal whose the unique ID is not registered in the filter list), the user manipulates a simple registration button on the screen (G12).

Upon this manipulation, the filtering is disabled and a timer (connection waiting timer) is started. After that, the simple connection guide means 79 changes the access point starting connection screen (G12) to a screen (G13) which requests of a user to operate the wireless LAN terminal in order to connect with the wireless LAN.

In this state, if the user operates the wireless LAN terminal to connect with the wireless LAN, the access point (the portable terminal device 100) permits the wireless LAN terminal to connect, and registers the unique ID of the wireless LAN terminal in the filter list of the access point (the portable terminal device 100).

After that, the portable terminal device 100 enables the filtering. Thus, the process of connecting the wireless LAN terminal with the access point (the portable terminal device 100) is completed. The simple connection guide means 79 changes the screen (G13) to the screen (G14). This screen (G14) informs the user of enabling the wireless LAN terminal to communicate by the wireless LAN.

The number of times, in which the user manipulates the portable terminal device 100 until the unique ID of the unregistered wireless LAN terminal is registered and the wireless LAN terminal can communicate with the portable terminal device 100, is two, as described above.

That is, by using the simple connection process in the first exemplary embodiment, the user can enable the unregistered wireless LAN terminal to communicate with the access point (the portable terminal device 100) by the two manipulations.

Next, as a reference example, a procedure of registering by manual entry the unique ID (MAC address) of the wireless LAN terminal in the filter list will be described.

When the user selects the access point setting on an access point mode screen (G11) such as shown in FIG. 5 and manipulates the enter button, the simple connection guide means 79 changes the screen (G11) to an access point setting screen (G15).

When the user selects the MAC filter setting on this screen (G15) and manipulates the enter button, the simple connection guide means 79 changes the screen (G15) to a MAC filter setting screen (G16). When the user manipulates an add button on the MAC filter setting screen (G16), the simple connection guide means 79 changes the screen (G16) to a MAC address input screen (G17). Then, the portable terminal device 100 waits to input the MAC address.

The user recognizes (acquires) the MAC address of the wireless LAN terminal by, for example, manipulating the wireless LAN terminal. If a general user without sufficient knowledge tries to look up (acquire) the MAC address, the user needs to work referring to a manual and the like.

When the user inputs the MAC address by manual entry into the wireless LAN terminal and manipulates the enter button, after acquiring (looking up) the MAC address, the simple connection guide means 79 changes the screen (G17) to a MAC filter setting screen (G18). The newly registered MAC address has been added in the address list displayed on the screen (G18).

In the above-mentioned manner, the MAC address is registered in the filter list. After that, when connecting the registered wireless LAN terminal with the access point (the portable terminal device 100), the user needs to manipulate the portable terminal device 100, in order to return the screen to the access point mode screen (G11) and change the access point mode screen (G11) to the starting access point starting connection screen (G12 (see FIG. 4)). Accordingly, in case where the MAC address is registered into the portable terminal device 100 by manual entry, the number of times which the user registers the MAC address into the portable terminal device 100 is seven times (eight times, including an address input).

Thus, in the process (manual registration process) where the user registers the unique ID of the wireless LAN terminal into the portable terminal device 100 by manual entry and connects the wireless LAN terminal with an access point (the portable terminal device 100), seven (eight) manipulations (actions) are required. Therefore, the number of manipulations in the manual registration process is lager than in the case where the aforementioned simple connection process is used (two manipulations). Moreover, it is obvious that the manipulations in the manual registration process are complicated.

Next, an operation procedure and processing procedure of the portable terminal device in the first exemplary embodiment will be described with reference to FIGS. 6 and 7.

Figure 6:
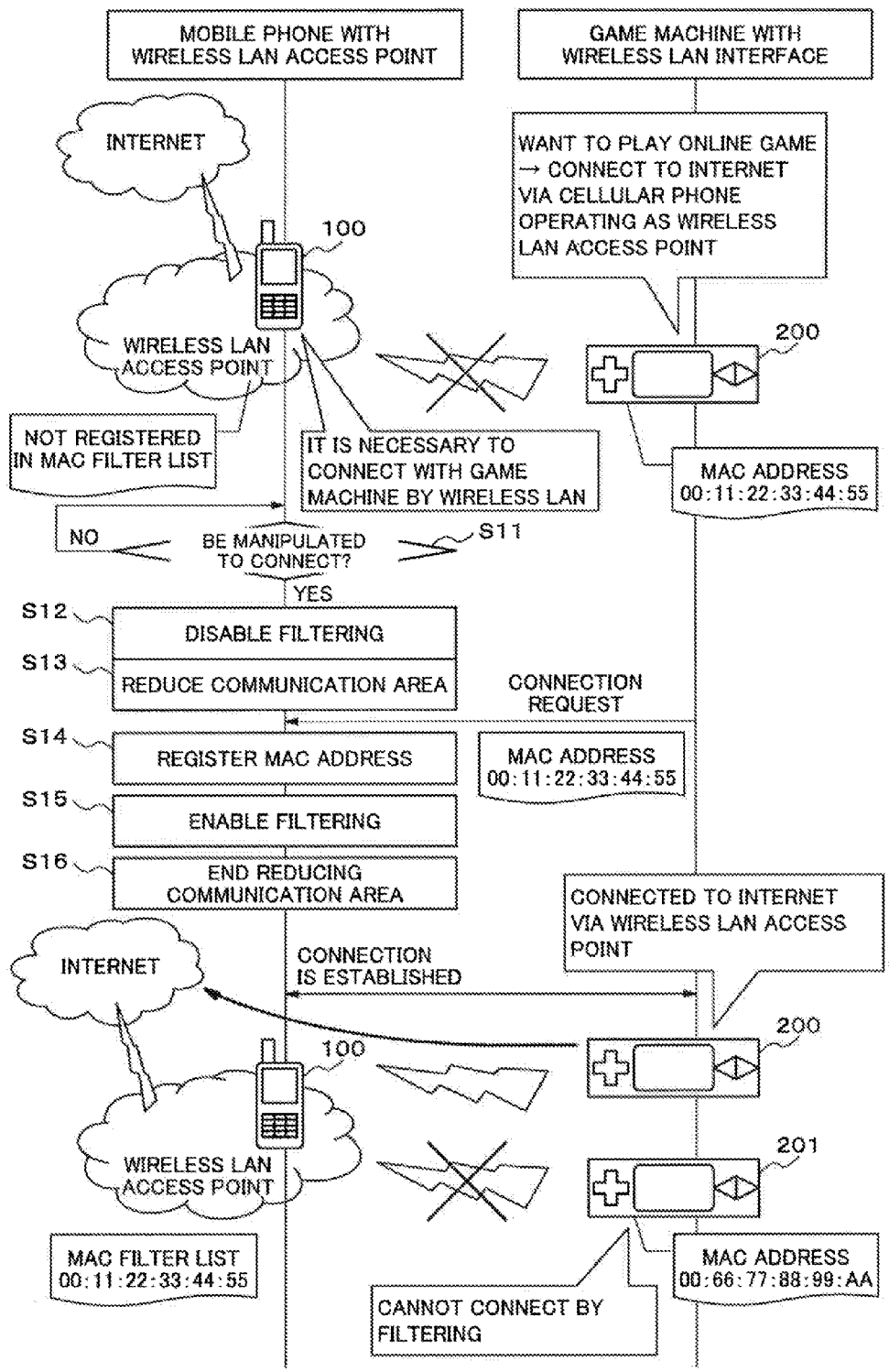
FIG. 6 is a diagram showing an operation procedure of the simple-connection in which the mobile terminal device in the first exemplary embodiment according to the present invention performs.

FIG. 6 is a diagram showing an operation procedure when the portable terminal device in the first exemplary embodiment performs the simple connection process. FIG. 7 is a flow chart showing a processing procedure when the portable terminal device in the first exemplary embodiment performs the simple connection.

For example, it is assumed that a user needs to connect a wireless LAN terminal (for example, a game machine equipped with a wireless LAN interface) 200 with a portable terminal device (for example, a mobile phone provided with an access point function) 100, in order to play an online game using the wireless LAN terminal.

In this case, first, the portable terminal device 100 starts the simple connection process based on the user manipulating (YES at S11 in FIG. 6).

Figure 7:
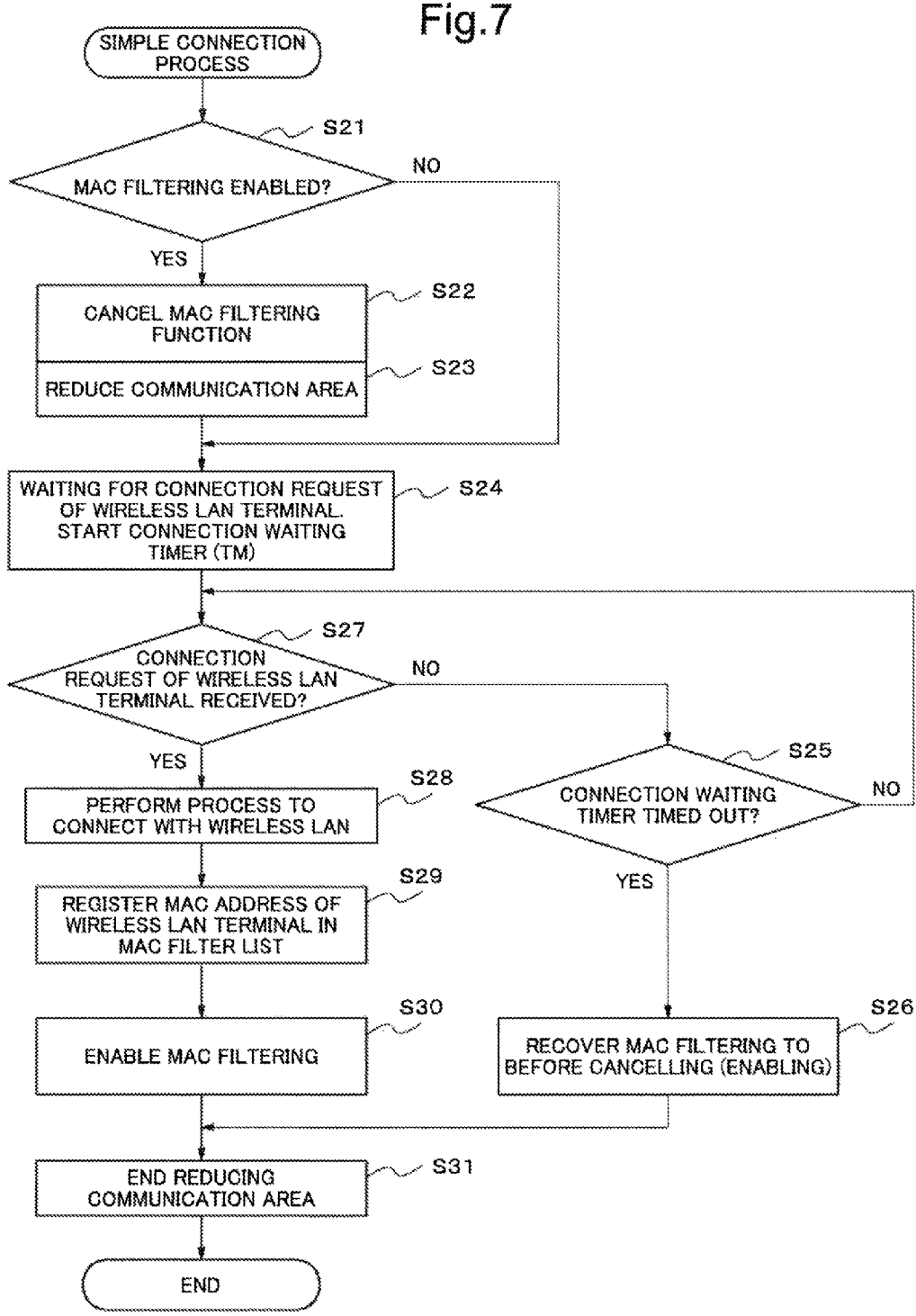
FIG. 7 is a flow chart showing a processing procedure of the simple-connection in which the mobile terminal device in the first exemplary embodiment according to the present invention performs.

When the simple connection process is started, the portable terminal device 100 determines whether or not the filtering (MAC filtering) which uses the MAC address is enabled (S21 in FIG. 7). If the filtering is enabled, the portable terminal device 100 disables the filtering (S12 in FIG. 6 and S22 in FIG. 7). Further, the portable terminal device 100 reduces the communication area in which it can communicate with the wireless LAN terminal 200 (S13 in FIG. 6 and S23 in FIG. 7).

Next, in order to restrict a connection waiting time, the portable terminal device 100 starts the connection waiting timer TM (S24 in FIG. 7). The portable terminal device 100 enters a standby state to wait for a connection request sent from the wireless LAN terminal 200.

If the connection waiting timer TM times out (YES at S25 in FIG. 7), the portable terminal device 100 enables the filtering (S26 in FIG. 7). Thus, the portable terminal device 100 ends the simple connection process.

On the other hand, if the connection request is sent from the wireless LAN terminal 200 within the period the connection waiting timer TM is counting time (YES at S27 in FIG. 7), the portable terminal device 100 resumes the simple connection process (S28 in FIG. 7). The portable terminal device 100 acquires the MAC address of the wireless LAN terminal 200 and registers the MAC address in the filter list (S14 in FIG. 6 and S29 in FIG. 7).

After that, the portable terminal device 100 enables the filtering (S15 in FIG. 6 and S30 in FIG. 7) and cancels the state in which the communication area is reduced (S16 in FIG. 6 and S31 in FIG. 7).

In the above-described manner, the portable terminal device 100 can perform the simple connection process. Accordingly, even the unregistered wireless LAN terminal 200 (the wireless LAN terminal whose MAC address is not registered) can be connected simply with the access point (the portable terminal device 100), without setting the MAC address by the user.

Furthermore, as mentioned above, the portable terminal device 100 recovers the filtering in the enabled state after the MAC address of the wireless LAN terminal 200 is registered in the filter list. Accordingly, when receiving the connection request from an undesired wireless LAN terminal 201, the portable terminal device 100 can reject the connection with the wireless LAN terminal 201 by the filtering.

As has been described above, in the portable terminal device 100 of the first exemplary embodiment, the simple connection means 73 performs the following process in order to connect (communicate) with the unregistered wireless LAN terminal 200. That is, the simple connection means 73 disables the filtering. Then, upon receiving the connection request from the wireless LAN terminal 200 during the state in which the filtering is disabled, the simple connection means 73 acquires the unique ID of the wireless LAN terminal 200 and registers the acquired unique ID in the filter list. After registering the unique ID of the wireless LAN terminal 200 in the filter list, the simple connection means 73 enables the filtering. Accordingly, even the unregistered wireless LAN terminal 200 can connect (communicate) simply with the access point (the portable terminal device 100), without performing a setting task to register the unique ID by the user.

Furthermore, the simple connection means 73 enables the filtering immediately after registering the unique ID. This process prevents using unfairly the access point by other wireless LAN terminals.

Further, the simple connection means 73 includes the communication area reduction means 77. As described above, in the state where the filtering is disabled, this communication area reduction means 77 reduces the communication area in which the portable terminal device 100 can communicate with the wireless LAN terminal 200 compared to the state where the filtering is enabled. This process also prevents using unfairly the access point by other wireless LAN terminals and the improper connection, in the state where the filtering is disabled.

The communication area reduction means 77 reduces the communication area by lowering the output level of the radio wave. Accordingly, the communication area reduction means 77 can restrict the communication area with high accuracy by a simple circuit configuration.

The simple connection means 73 includes the simple connection time restriction means 78. By this simple connection time restriction means 78, when no connection request is received from the wireless LAN terminal 200 within a predetermined period of time since the filtering is disabled, the simple connection means 78 enables the filtering. Accordingly, the simple connection means 73 avoids a situation where the filtering is disabled over a long time. By this way, the problems of unauthorized use and of improper connection are prevented.

Further, the simple connection means 73 includes the simple connection guide means 79. This simple connection guide means 79 displays the procedure to carry out the simple connection process on the screen. Accordingly, the user can use the access point function of the portable terminal device 100 easily without reading an instruction manual.

(Second Exemplary Embodiment)

Figure 8:
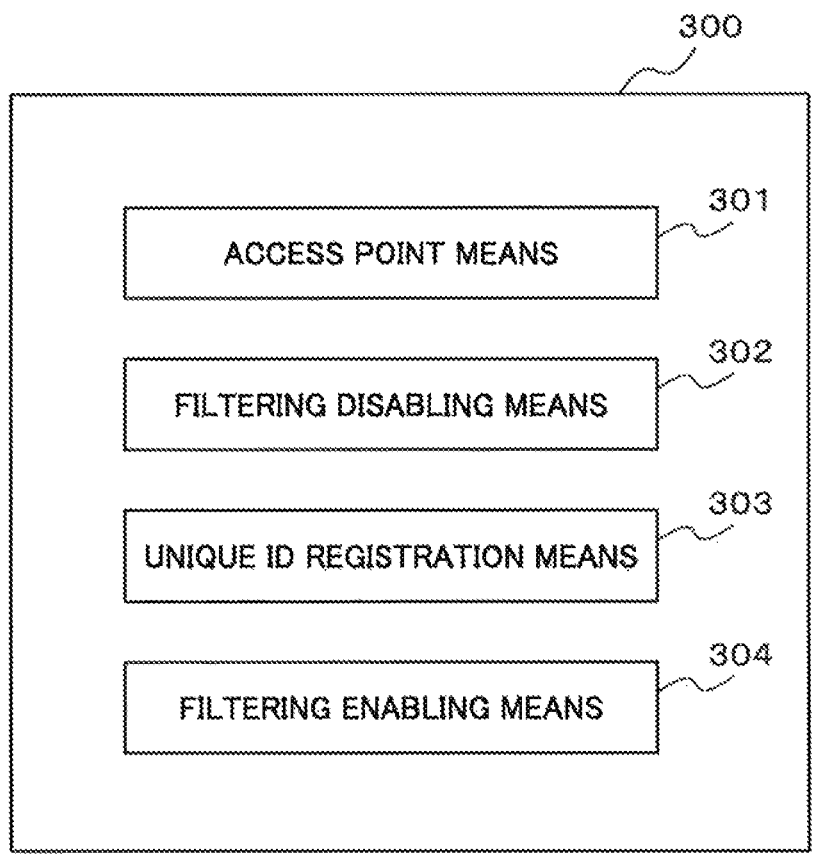
FIG. 8 is a block diagram showing a configuration of a communication device in a second exemplary embodiment according to the present invention.

FIG. 8 is a block diagram showing a configuration of a communication device 300 in the second exemplary embodiment. As shown in FIG. 8, the communication device 300 includes access point means 301, filtering disabling means 302, unique ID registration means 303 and filtering enabling means 304.

The access point means 301 connects a wireless terminal with at least one of a lower network and an upper network. The filtering disabling means 302 disables the filtering which prevents connecting with the unregistered wireless terminal whose the unique ID is not registered in the filter list (the wireless terminal whose the unique ID is not registered in the filter'list). When the connection request is received from the wireless terminal in the state where the filtering is disabled, the unique ID registration means 303 acquires the unique ID of the wireless terminal and registers the acquired unique ID in the filter list. After the unique ID of the wireless terminal is registered in the filter list, the filtering enabling means 304 enables the filtering.

As described above, according to the second exemplary embodiment, the communication device 300 has the above-described configuration. Accordingly, the communication device 300 enables the unregistered wireless terminal to connect simply with the access point, without performing the setting task to register the unique ID by the user.

(Third Exemplary Embodiment)

A communication device in the third exemplary embodiment according to the present invention includes a first wireless device, a second wireless device, access point means, filtering means and simple connection means.

The first wireless device communicates with a base station in the upper network. The second wireless device communicates with a wireless terminal in a lower network. The access point means connects the wireless terminal with at least one of the lower network and the upper network. The filtering means prevents connecting with the unregistered wireless terminal whose the unique ID is not registered in the filter list.

The simple connection means connects the unregistered wireless terminal simply with at least one of the lower network and the upper network. This simple connection means includes filtering disabling means, automatic unique ID registration means and filtering enabling means. The filtering disabling means disables the filtering in order to enable the unregistered wireless terminal to connect with the communication device of the third exemplary embodiment. When the connection request is received from the wireless terminal in the state where the filtering is disabled, the automatic unique ID registration means acquires the unique ID of the wireless terminal and registers the acquired unique ID in the filter list automatically. After the unique ID of the wireless terminal is registered in the filter list, the filtering enabling means enables the filtering.

(Fourth Exemplary Embodiment)

The fourth exemplary embodiment according to the present invention relates to a connection method which is applied to the communication device, described in the third exemplary embodiment, including the first wireless device, the second wireless device, the access point means and the filtering means. The connection method of the fourth exemplary embodiment includes, as a simple connection procedure which connects the unregistered wireless terminal simply with at least one of the lower network and the upper network: a filtering disabling process of disabling the filtering in order to enable the unregistered wireless terminal to connect; an automatic unique ID registration process of, when the connection request is received from the wireless terminal in the state where the filtering is disabled, acquiring the unique ID of the wireless terminal and registering the acquired unique ID in the filter list automatically; and a filtering enabling process of enabling the filtering after the unique ID of the wireless terminal is registered in the filter list.

(Fifth Exemplary Embodiment)

The fifth exemplary embodiment according to the present invention relates to a connection program which is applied to the communication device, described in the third exemplary embodiment, including the first wireless device, the second wireless device, the access point means and the filtering means. This connection program enables the communication device to function as the simple connection means to connect the unregistered wireless terminal simply with at least one of the lower network and the upper network. Specifically, the connection program enables the communication device to include: a filtering disabling function to disable the filtering; an automatic unique ID registration function to, when a connection request is received from the wireless terminal in the state where the filtering is disabled, acquire the unique ID of the wireless terminal and register the acquired unique ID in the filter list automatically; and a filtering enabling function to enable the filtering after the unique ID of the wireless terminal is registered in the filter list.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

For example, the exemplary embodiments described above assume a mobile phone provided with the wireless LAN access point function as an example of a communication device. The present invention can be applied also to, in place of that, a PHS terminal, PDA, portable-type personal computer and other communication devices, which are provided with the equivalent function. In these cases, the same effect is obtained as in the above-described exemplary embodiments.

This application is based upon and claims the benefit of priority from Japanese patent application No. 2009-111424, filed on Apr. 30, 2009, the disclosure of which is incorporated herein in its entirety by reference.

INDUSTRIAL APPLICABILITY

The present invention can be applied to a portable terminal device operating as an access point of wireless LAN, and to a method and a program for connecting a wireless LAN terminal to such a portable terminal device. In particular, the present invention is useful for a portable terminal device which may be requested to function as an access point in an unexpected situation or in an urgent manner.

REFERENCE SIGNS LIST

70 Terminal control unit
71 Access point means
72 Filtering means
73 Simple connection means
74 Filtering disabling means
75 Unique ID registration means
76 Filtering enabling means
77 Communication area reduction means
78 Simple connection time restriction means
79 Simple connection guide means
81 Wireless device
91 Wireless device
100 Portable terminal device
200 Wireless LAN terminal

The invention claimed is:

1. A communication device comprising:
an access point unit which is configured to connect a wireless terminal with at least one of a lower network and an upper network;
a filtering disabling unit configured to disable filtering, which prevents connecting with an unregistered wireless terminal whose unique ID is not registered a filter list;
a unique ID registration unit which is configured to acquire the unique ID of the wireless terminal and to register the acquired unique ID in the filter list if a connection request is received from the wireless terminal and filtering is disabled: and
a filtering enabling unit which is configured to enable filtering after the unique ID of the wireless terminal is registered in the filter list: and
a communication area reduction unit which is configured to reduce a communication area in which the wireless terminal is configured to communicate when filtering is disabled, as compared to when filtering is enabled.

2. The communication device according to claim 1, wherein the communication area reduction unit is configured to lower an output level of a radio wave as compared to when filtering is enabled, upon filtering being disabled.

3. The communication device according to claim 1, further comprising:
a connection time restriction unit which is configuered to enable filtering when no connection request is received from the wireless terminal during a predetermined period after filtering is disabled.

4. The communication device according to claim 1, further comprising:
a connection guide unit which is configured to display a procedure of connection on a screen.

5. A communication device comprising:
access point means for connecting a wireless terminal with at least one of a lower network and an upper network;
filtering disabling means for disabling filtering, which prevents connecting with an unregistered wireless terminal whose unique ID is not registered in a filter list;
unique ID registration means for acquiring the unique ID of the wireless terminal and registering the acquired unique ID in the filter list if a connection request is received from the wireless terminal and filtering is disabled;
filtering enabling means for enabling filtering after the unique ID of the wireless terminal is registered in the filter list; and
communication area reduction means for reducing a communication area in which the wireless terminal is configured to communicate when filtering is disabled, as compared to when filtering is enabled.

6. A connection method, comprising:
connecting a wireless terminal with at least one of a lower network and an upper network:
disabling filtering, which prevents connecting with an unregistered wireless terminal whose unique ID is not registered in a filter list;
acquiring the unique ID of the wireless terminal and registering the acquired unique ID in the filter list if a connection request is received from the wireless terminal and filtering is disabled;
enabling the filtering aft- he unique ID of the wireless terminal is registered in the filter list; and
reducing a communication area in which the wireless terminal is configured to communicate when filtering is disabled, as compared to when filtering is enabled.

7. The connection method according to claim 6, further comprising:
enabling filtering when no connection request is received from the wireless terminal during a predetermined period after disabling filtering.

8. A non-transitory storage medium storing a program, the program comprising:
a connection program for realizing the connection method according to claim 6 by a computer.

* * * * *